Patented June 14, 1938

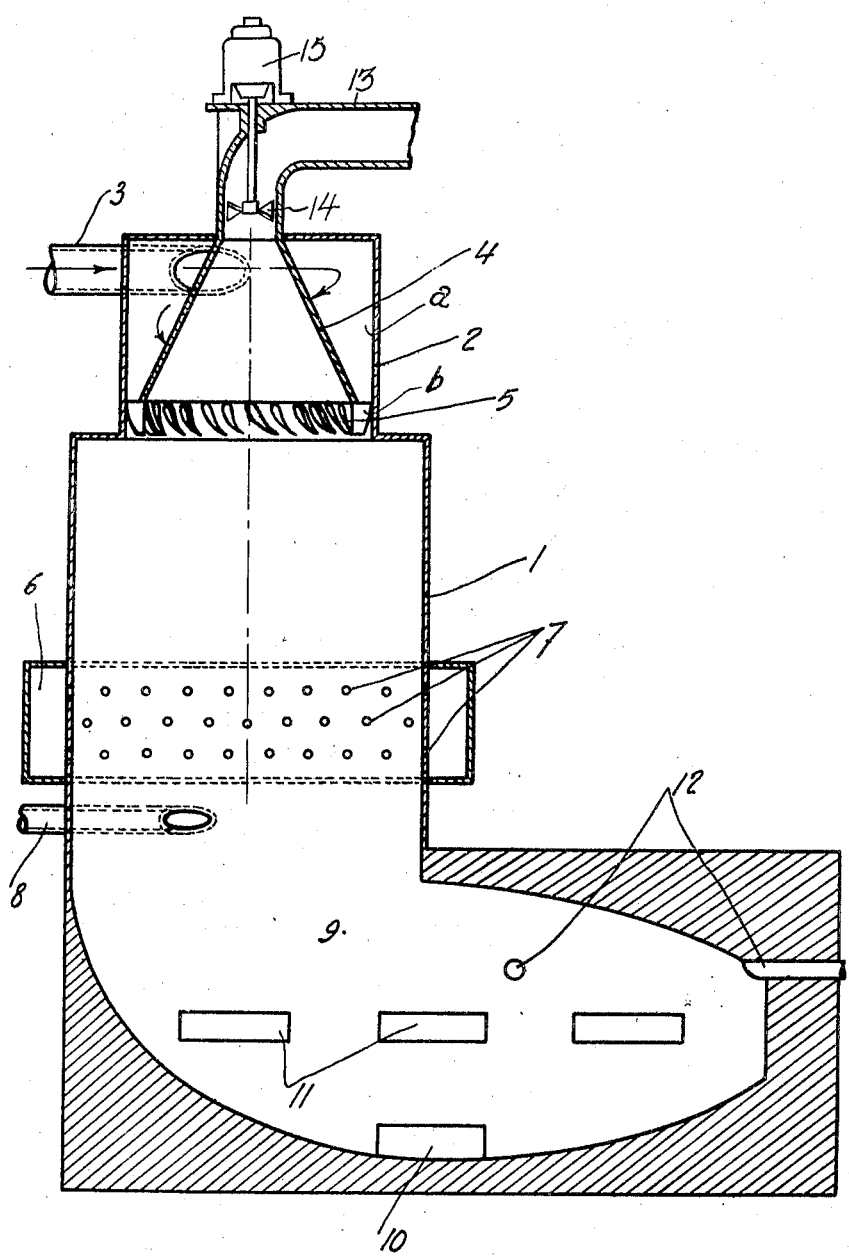

2,120,785

UNITED STATES PATENT OFFICE 2,120,785

FURNACE FOR TREATING PULVERULENT MATERIALS

Eugène Camille Saint-Jacques, Paris, France

Application March 4, 1936, Serial No. 67,137
In France March 12, 1935

1 Claim. (Cl. 266—29)

The present invention has for its subject matter a furnace capable of being used for any roasting or calcination operations upon pulverulent materials and in particular for oxidation, reduction or other treatments of ores in the pulverulent state.

This furnace is constituted essentially by a cylindrical body forming a turbulent heater surmounted by a distributing extension and in which the materials to be treated enter, with a spiral movement with more or less flattened spirals.

In this cylindrical body there open, preferably tangentially and at suitable points, inlets for combustion air if necessary, and if desired a gas, heavy oil, pulverized fuel or other burner or burners.

The cylindrical body forming the heater for the materials to be treated terminates at its lower part in a reverberatory furnace preferably provided with one or several burners, and in which the materials in the molten state achieve an intimate intermixing and react upon one another.

Due to the combination of a turbulent heater in which the pulverulent materials to be treated descend turbulently and are heated progressively to above 1000° C. for example, and of a reverberatory furnace in which the treatment or the reactions of the materials in the fused state simply take place, there may be given to this latter part of the furnace (the heat efficiency of which is in general rather low in comparison with that of a turbulent furnace) much smaller dimensions than if an ordinary reverberatory furnace merely be used to effect the same operations.

In the appended drawing there has been shown diagrammatically by way of non-limiting example an embodiment of the subject of the invention.

The furnace comprises a cylindrical body 1 which communicates at its upper part with a cylindrical extension 2, to which is connected tangentially a pipe 3 through which the materials to be treated enter, previously reduced to the pulverulent state and held in suspension in any suitable gaseous fluid.

At the interior of the cylindrical extension is arranged an inverted cone-shaped funnel 4 the top of which communicates with a flue 13 in which is located a suction fan 14 driven by a motor 15, and the base of which is connected to the wall of the cylindrical extension by the intermediary of blades 5, preferably inwardly curved, uniformly distributed over all the circumference and between which the material and the gaseous fluid are forced to pass to enter into the body 1.

Combustion air may be passed under pressure into an annular chamber 6 whence it enters into the cylindrical body 1 tangentially or not into the cylindrical body 1 by open apertures 7.

8 is a gas, heavy oil, pulverized fuel or other burner the flame of which enters tangentially into the cylindrical body 1 and rises during the operation of the apparatus under the effect of the internal depression created by the suction fan so as to enter into contact with the gyratory descending current of the materials to be treated.

The diameter of the extension 2 is substantially smaller than that of the body 1.

In its lower part the cylindrical fore-body 1 opens into a reverberatory furnace 9 the dimensions of which may be very reduced and in which 10 and 11 are the discharge openings for the molten bath and the slag swimming on the furnace respectively. Into the furnace 9 one or more burners 12 similar to the burner 8 may open.

The operation of the furnace is as follows:

The pulverulent material to be treated, which material is suspended in a gaseous fluid and if necessary mixed with fluxes or other materials which are also in a pulverulent state, is tangentially introduced into the space between the cone 4 and the cylindrical fore-body 2 and takes a spiral descending movement in the said space. In the course of the said movement the material is uniformly distributed around the cone 4 so that the whole periphery of this cone is equally covered with the same.

The speeding up of the mixture of gas and material is progressively obtained through the progressive throttling of the section of space $a$ between the cone 4 and the housing 2. The mixture takes a speed which becomes greater and greater as the mixture effects its spiral descending movement and when it arrives in the very narrow annular space $b$ which is occupied by the vanes 5 it is automatically carried forth and directed into the inner part of the heater 1 through the said vanes which are preferably curved in order to flatten the spirals followed by the mixture to be treated during its spiral movement when descending through the said heater; it results therefrom that the material to be treated follows, in this heater, a longer way and thus remains longer in the same, which insures a more intensive heating of the particles of treated material.

When entering the body 1 (of larger diameter) through the vanes 5 the particles of the material to be treated proceed on their spiral descending movement the spirals of which are preferably flattened inwardly of the heater. During this time the fan which communicates with the top of the cone 4 produces a current of partial vacuum upwardly in the middle line of the circular trajectory followed by the mixture of gas and material, combustion air under pressure entering the body 1 of the furnace through the openings 7.

Due to this combination of the gyratory movement imparted to the mixture of gas and pulverulent materials with this rising current of partial vacuum there is produced, on the one hand, a rational intermixing of the gases and materials and, on the other hand, a braking of the gravity fall of the latter and, lastly, a horizontal separation or classification effect in the materials which, upon accentuating the dispersion of the latter in the gaseous stream, facilitates their contact with the combustion gases and renders the roasting or calcination operation still more complete.

In the inner of the heater 1 the gaseous stream holding the material to be treated in a suspended condition is inflamed through any known means, for instance by means of the burner 8. During their spiral gyratory movement in the inner of the furnace the particles of the material have quite time for being heated up to temperatures of more than 1000° C. for instance, and even for beginning to mix with and to react upon the fluxes or other materials which have been introduced with them, the gases which are produced being drawn off through the fan which communicates with the top of the cone 4.

When entering the reverberatory furnace 8 which is heated through the burner or burners 12, the materials are molten; the one, for instance, and the flux are intimately mixed, thus forming the molten bath which is decanted.

At the given moment the metal is evacuated, for instance at 10 and the slag at 11, in the known manner.

What I claim is:

Apparatus for the treatment of finely comminuted metalliferous particles comprising a cylindrical fluxing chamber, a cylindrical distributor having a smaller diameter than that of the fluxing chamber for tangentially projecting the particles in the top of said fluxing chamber whereby the particles take a downwardly swirling motion in the fluxing chamber, an annular chamber around the fluxing chamber in the bottom portion thereof, means for introducing combustion air into this latter chamber, apertures in said air chamber for establishing communication with the inside of the fluxing chamber, a burner opening tangentially into the fluxing chamber and disposed below the annular air chamber, a reverberatory furnace directly connected to the bottom of the fluxing chamber and into which the particles are received, means for supplying heat to said furnace whereby the fluxed particles are melted and maintained in a fluid condition, discharge openings in said furnace for the molten particles, the cylindrical distributor being provided with an axial opening at its top, and a fan connected to said opening for creating a suction in the inside of the fluxing chamber.

EUGÈNE CAMILLE SAINT-JACQUES.